United States Patent Office 2,740,448
Patented Apr. 3, 1956

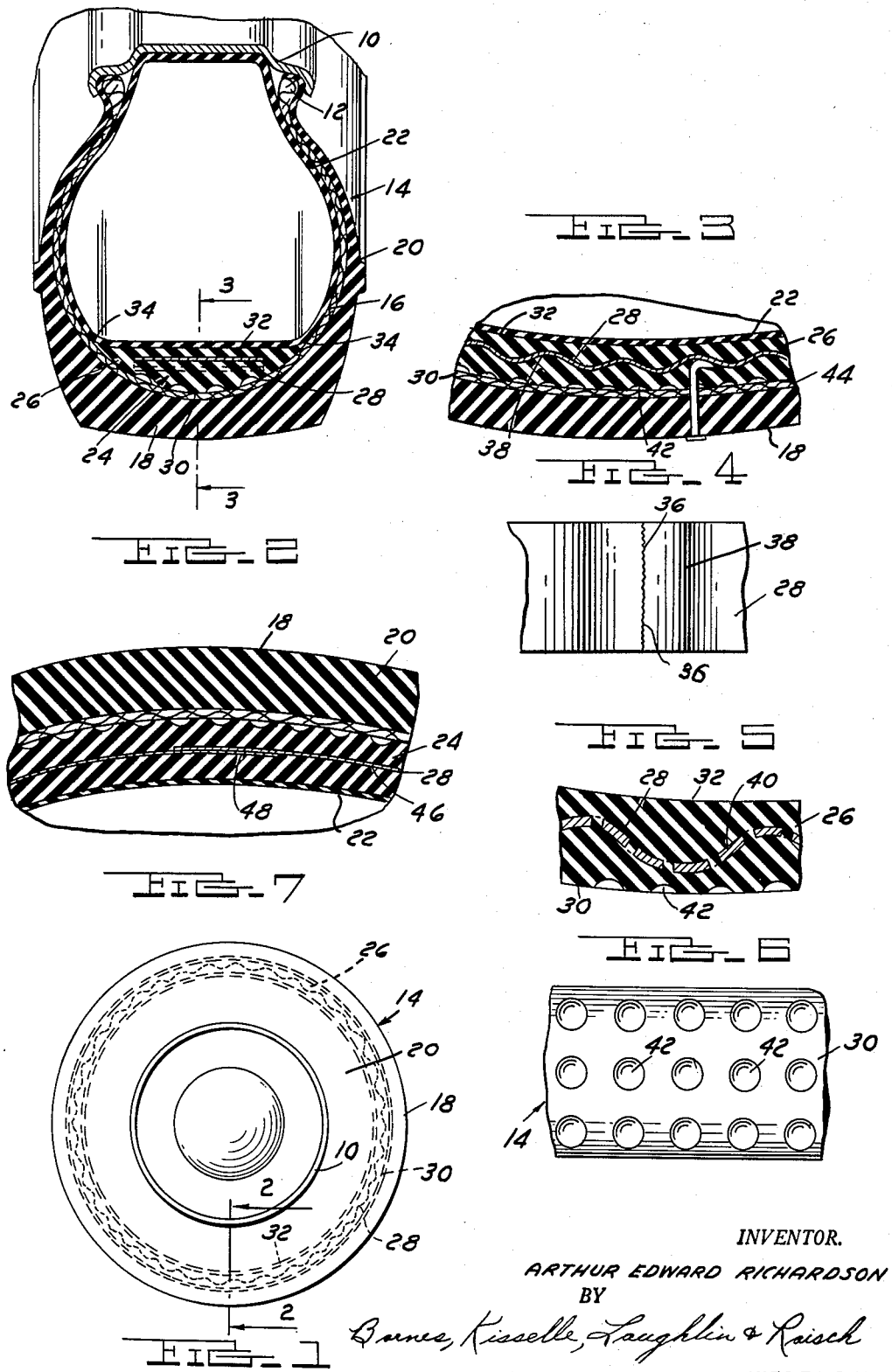

2,740,448

TIRE LINER

Arthur Edward Richardson, Detroit, Mich.

Application December 17, 1951, Serial No. 261,991

3 Claims. (Cl. 152—207)

This invention relates to a tire liner and more particularly to a liner insertable within a vehicle tire to prevent puncturing of the inner tube within the tire.

It is an object of this invention to provide a tire liner which is designed to effectively prevent puncturing of the inner tube within the tire by sharp objects such as nails, glass and the like.

More specifically, the invention contemplates a tire liner in the form of a rubber ring having a metal deflector molded therein, the deflector being dimensioned and disposed such as to form a barrier between the tread of the tire and the inner tube. The barrier is in the form of a metallic strip which extends circumferentially within the liner. The metallic strip is fashioned and molded in the rubber liner member such as to be circumferentially expansible to thereby automatically compensate for expansion of the tire due to inflation and heat. Furthermore, the liner is provided with means in the form of suction cups which insure a non-slipping connection between the liner and the tire casing.

In the drawings:

Fig. 1 is a side elevation of a tire mounted on a vehicle wheel and provided with the tire liner of this invention.

Fig. 2 is a section along the lines 2—2 in Fig. 1.

Fig. 3 is a section along the lines 3—3 in Fig. 2 and showing the manner in which a nail is prevented from puncturing the inner tube by means of the liner of this invention.

Fig. 4 is a fragmentary view of the metal band within the liner.

Fig. 5 is a fragmentary sectional view of the liner.

Fig. 6 is a fragmentary plan view of the liner.

Fig. 7 is a sectional view generally similar to Fig. 3 and showing a modified construction of the liner of this invention.

Referring to the drawings and particularly to Figs. 1 and 2, there is illustrated a vehicle wheel which includes a rim member 10 with which the bead 12 of a tire 14 is interengaged. The tire includes a casing 16, the outer peripheral surface of the tire comprising a rubber tread portion 18 which is connected with the beads 12 by rubber side wall portions 20. Within the tire there is the conventional inner tube 22. Tube 22 is inflated such as to bear against the inner face of the tire and rim 10. The liner of this invention comprises an annular member 24 which, as is shown in Fig. 2, includes a rubber body portion 26 having molded therein a metallic band 28. The body 26 is in the form of a ring adapted to be inserted within tire 14 and having a generally arcuate outer peripheral surface 30 and a generally flat inner peripheral surface 32. The surfaces 30 and 32 intersect along feathered edge portions 34 around each side of the liner 24. The curvature of surface 30 in an axial direction corresponds with the curvature of the inner face of the tire casing 16 adjacent the tread portion of the tire.

The metallic band 28 is imbedded in body portion 26 between faces 30 and 32. The rubber body portion 26 completely surrounds the metal band 28. Band 28 is preferably in the form of a strip of metal shaped into an annular ring and having its opposite end portions butt welded together as indicated at 36 in Fig. 4. Band 28 is preferably provided with transverse corrugations 38. Corrugations 38 extend in a direction axially of the wheel when the liner is arranged within the tire. The body 26 of liner 24 has a width such that the liner extends across substantially the entire tread portion 18 of the tire, and the band 28 is dimensioned such that it extends across at least the central portion of the tread, that is, the portion that receives the most wear and abuse. Liner 24 is fashioned with the band 28 therein by conventional rubber molding and vulcanizing methods. In order to further assist in fixedly positioning band 28 within body portion 26 of liner 24, band 28 is preferably provided with a series of openings 40 therethrough so that, when the body 26 is molded, the rubber flows through these openings and provides integrally formed connections between the portions of the body on opposite sides of band 28. Body portion 36 is fashioned with a plurality of semi-spherical depressions 42 over the surface 30 thereof. These depressions serve as suction cups for firmly gripping the inner face of tire casing 16 when the liner is arranged within the tire and the tube 22 is inflated.

Liner 24 will, of course, have an outer diameter corresponding to the inner diameter of the tire casing on which it is used so that, when the liner is positioned within the the tire as illustrated in Fig. 2, the outer surface 30 of liner 24 is in coplanar engagement with the inner surface of the tire casing 16. Thus, when tube 22 is inflated, liner 24 is pressed firmly against the inner surface of tire casing 16. The pressure exerted by tube 22 against liner 24 is sufficient to cause the depressions 42 to act as suction cups which provide for a firm and non-slipping engagement between the liner and the tire. When the liner is arranged within a tire as described, it will be observed that the tread portion of the tire is protected over a wide area by the metallic band 28. If the tire should be punctured by a nail or the like such as illustrated at 44, the nail will be deflected by the band 28 so that the nail will not penetrate through the tube 22. The corrugations 38 assist in deflecting the end of the nail or other object which penetrates through the tire. Corrugations 38 are important for also another reason. They permit the liner 24 to expand or contract as necessary in accordance with the expansion and contraction of the tire in response to inflation and temperature.

In Fig. 7 I have illustrated a modified form of tire liner which is substantially the same as the liner previously described with the exception, however, that the metallic band 46 within the liner is fashioned into annular shape from a flat strip of metal rather than a corrugated strip. In this form of construction the end portions of the metal strip from which band 46 is fashioned are overlapped such as indicated at 48. The overlapped portions are not secured together. They simply lie flatly one against the other in an unconnected relation so that, as the tire expands and contracts, the overlapping portions 48 of band 46 are permitted to slide past one another and thereby accommodate the liner to the operating conditions of the tire.

Thus, it will be seen that I have provided a simply constructed liner which is very effective in preventing the inner tube within a tire from being punctured. The liner provides a metallic barrier between the tread of the tire and the inner tube, and this metallic barrier is constructed and arranged such as to automatically compensate for expansion or contraction of the tire by reason of heat, etc. The liner of this invention is therefore highly desirable for use on vehicles, such as garbage trucks and the like, which obviously have to travel over particularly dangerous roads and alleys.

I claim:

1. A liner for a vehicle tire comprising an annular body member dimensioned such as to be snugly received within the tire casing with which it is to be used, said body member being formed of a resilient, readily distortable material and having an annular metallic member imbedded therein, said annular metallic member extending continuously around said body member and being dimensioned in a direction axially of the body member to extend across a major portion of the tread of the tire in which the liner is employed, said annular metallic member having axially extending corrugations therein which extend continuously across the width of said member to render the liner circumferentially expandible as a whole, said body member being circumferentially expandible with said annular metallic member.

2. A liner for a vehicle tire comprising an annular body member dimensioned such as to be snugly received within the tire casing with which it is to be used, said body member being formed of a readily distortable material and having an annular metallic member imbedded therein, said metallic member comprising an annular metal strip having axially extending corrugations therein, the ends of said strip being permanently connected together, said corrugations permitting said annular metallic member to expand circumferentially as a whole and said annular body member being circumferentially expandible therewith, said metallic member extending continuously around said body member and being dimensioned in a direction axially of the body member to extend across a major portion of the tread of the tire in which the liner is employed.

3. In a tire, means for preventing puncturing of the inner tube within the tire comprising a body of readily distortable material extending continuously circumferentially of the tire and having an annular metal strip therein, said body and said annular metal strip being dimensioned in width to extend across substantially the entire width of the tire tread, said annular metal strip being circumferentially continuous and having a plurality of corrugations which extend across the entire width thereof, said corrugations permitting said strip to expand circumferentially throughout its lateral extent in response to circumferential expansion of the tire.

References Cited in the file of this patent

UNITED STATES PATENTS

| 517,033 | Davy | Mar. 27, 1894 |
| 866,297 | Noyes | Sept. 17, 1907 |
| 1,217,754 | Grube | Feb. 27, 1917 |
| 1,222,729 | Bryant | Apr. 17, 1917 |
| 1,232,906 | Ferguson | July 10, 1917 |
| 1,346,503 | Master | July 13, 1920 |
| 1,382,565 | Stockel | June 21, 1921 |
| 1,428,726 | Warth | Sept. 12, 1922 |
| 1,455,855 | Andrich | May 22, 1923 |
| 1,475,326 | Stephens | Nov. 27, 1923 |

FOREIGN PATENTS

| 422,171 | France | Mar. 15, 1911 |